United States Patent
Chou

(10) Patent No.: US 11,775,314 B2
(45) Date of Patent: Oct. 3, 2023

(54) SYSTEM AND METHOD FOR BMC AND BIOS BOOTING USING A SHARED NON-VOLATILE MEMORY MODULE

(71) Applicant: QUANTA COMPUTER INC., Taoyuan (TW)

(72) Inventor: Chih-Sheng Chou, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 78 days.

(21) Appl. No.: 17/517,499

(22) Filed: Nov. 2, 2021

(65) Prior Publication Data
US 2023/0140164 A1 May 4, 2023

(51) Int. Cl.
*G06F 9/4401* (2018.01)
*G06F 9/445* (2018.01)

(52) U.S. Cl.
CPC .......... *G06F 9/4403* (2013.01); *G06F 9/4408* (2013.01); *G06F 9/4401* (2013.01); *G06F 9/445* (2013.01)

(58) Field of Classification Search
CPC ...... G06F 9/4401; G06F 9/4403; G06F 9/445; G06F 9/4408
USPC ......................................................... 713/1, 2
See application file for complete search history.

(56) References Cited

U.S. PATENT DOCUMENTS

| | | | | |
|---|---|---|---|---|
| 2012/0173922 A1* | 7/2012 | Cheng | ................. | G06F 11/2025 714/13 |
| 2014/0047224 A1* | 2/2014 | Ayanam | .................. | G06F 8/654 713/1 |
| 2015/0355911 A1* | 12/2015 | Bibb, Jr. | ............... | G06F 21/572 713/2 |
| 2016/0328300 A1* | 11/2016 | Rahardjo | ............ | G06F 11/1417 |
| 2017/0010884 A1 | 1/2017 | Liu et al. | | |
| 2018/0095693 A1* | 4/2018 | Kikkawa | ............... | G06F 3/0607 |
| 2018/0322013 A1* | 11/2018 | Yang | ................... | G06F 11/1417 |
| 2020/0042710 A1 | 2/2020 | Liu et al. | | |
| 2020/0082090 A1 | 3/2020 | Samuel et al. | | |
| 2020/0394144 A1* | 12/2020 | Osada | .................... | G06F 9/4406 |
| 2021/0064734 A1* | 3/2021 | Chen | ..................... | G06F 21/575 |
| 2021/0200555 A1* | 7/2021 | Wu | ....................... | G06F 9/4416 |

FOREIGN PATENT DOCUMENTS

TW          202013137 A          4/2020

OTHER PUBLICATIONS

TW Office Action for Application No. 111104989, dated Mar. 20, 2023, w/ First Office Action Summary.
TW Search Report for Application No. 111104989, dated Mar. 20, 2023, w/ First Office Action.

* cited by examiner

*Primary Examiner* — Ji H Bae
(74) *Attorney, Agent, or Firm* — NIXON PEABODY LLP

(57) ABSTRACT

A computing system is provided. The computing system includes a central processing unit (CPU), a baseboard management controller (BMC), and a boot non-volatile memory. The BMC selects a boot partition in the computing system. The boot non-volatile memory stores at least two boot partitions as a primary boot area including a basic input/output system (BIOS) image and a secondary boot area including a BMC image. The BMC switches between the secondary boot area to boot the BMC and the primary boot area to boot the BIOS. Only one of the primary boot area or the secondary boot area is accessible when the BIOS is booting or when the BMC is booting.

20 Claims, 4 Drawing Sheets

SYSTEM AND METHOD FOR BMC AND BIOS BOOTING USING A SHARED NON-VOLATILE MEMORY MODULE

FIELD OF THE INVENTION

The present invention relates generally to booting sequences in computing systems, and more specifically, to using a baseboard management controller (BMC) to direct booting for the BMC and basic input/output system (BIOS) when boot instructions for both the BMC and BIOS are stored in the same non-volatile memory module.

BACKGROUND OF THE INVENTION

Computing systems (e.g., servers, desktop computers, laptop computers, etc.) are used in different contexts for a wide range of functions. Some computing systems operate on batteries and may require low-power operation to conserve charge on the batteries. On the other hand, some computing systems may be plugged into a power outlet, and low-power operation is not as important as computing performance. Many computing systems balance performance and power consumption, even when plugged into a power outlet. No matter what type of computing system is used, the computing system is typically initialized when powered-up. The process of initializing the computing system is called booting. Each computing system can have a different booting sequence or procedure based on the specific hardware components present in the computing system. Typically, computing systems store booting sequences or procedures in non-volatile memory. Controllers and processors present in the computing systems typically have different dedicated non-volatile memory modules for storing boot sequences that involve the controllers and processors. This balkanization of instructions into separate non-volatile memory modules for controllers and processors can result in suboptimal use of physical space on a motherboard.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a computing system is provided. The computing system includes a central processing unit (CPU), a baseboard management controller (BMC), and a boot non-volatile memory. The BMC selects a boot partition in the computing system. The boot non-volatile memory stores at least two boot partitions as a primary boot area including a basic input/output system (BIOS) image and a secondary boot area including a BMC image. The BMC switches between the secondary boot area to boot the BMC and the primary boot area to boot the BIOS. Only one of the primary boot area or the secondary boot area is accessible when the BIOS is booting or when the BMC is booting.

In an implementation, the system further includes a multiplexer (MUX) coupled to the boot non-volatile memory, the BMC, and the CPU. The MUX receives a control signal from the BMC for switching access between the primary boot area and the secondary boot area. In an implementation, the boot non-volatile memory is a serial peripheral interface (SPI) flash. In an implementation, the secondary boot area is only accessible by the BMC, and the primary boot area is only accessible by the CPU while booting the BIOS. During system runtime, the primary boot area is accessible by the BMC. In an implementation, the BMC is booted from the secondary boot area first before the BIOS is booted from the primary boot area. In an implementation, general purpose input/output (GPIO) pins that indicate system reset or power on signals are routed to the BMC. Status of the system reset or power on signals are used by the BMC to determine switching between the primary boot area and the secondary boot area of the boot non-volatile memory. In an implementation, receiving any one of the system reset or the power on signals triggers switching from the secondary boot area to the primary boot area. In an implementation, prior to switching from the secondary boot area to the primary boot area, the BMC flushes a runtime memory of the BMC to the secondary boot area. In an implementation, the BMC receiving a notification of a completion of the BIOS booting triggers switching from the primary boot area to the secondary boot area.

According to certain aspects of the present disclosure, a computer-implemented method is provided. The computer-implemented method includes booting a baseboard management controller (BMC) of a computing system from a secondary boot area of a boot non-volatile memory of the computing system. The boot non-volatile memory is coupled to both the BMC and a central processing unit (CPU) of the computing system. The computer-implemented method further includes receiving, at the BMC, a system reset signal or a power on signal. The computer-implemented method further includes handing over, by the BMC, access to the boot non-volatile memory of the computing system to the CPU. The computer-implemented method further includes booting, by the CPU, a basic input/output system (BIOS) from a primary boot area of the boot non-volatile memory. The computer-implemented method further includes handing over, by the CPU, access to the boot non-volatile memory of the computing system to the BMC.

In an implementation, the BMC provides a control signal to a multiplexer (MUX) coupled to the boot non-volatile memory, the BMC, and the CPU when handing over access to the CPU or when taking over access of the boot non-volatile memory. In an implementation, the boot non-volatile memory is a serial peripheral interface (SPI) flash. In an implementation, the secondary boot area is only accessible by the BMC and the primary boot area is only accessible by the CPU while booting the BMC or the BIOS. During system runtime, the primary boot area is accessible by the BMC. In an implementation, the system reset signal or the power on signal are received from general purpose input/output (GPIO) pins monitored by the BMC. In an implementation, handing over the boot non-volatile memory access to the CPU includes flushing a runtime memory of the BMC to the secondary boot area. In an implementation, the computer-implemented method further includes receiving, by the BMC, a notification of a completion of the BIOS booting. The notification indicates that the BMC take over boot non-volatile memory access from the CPU. In an implementation, the primary boot area is a first contiguous block of memory within the boot non-volatile memory, and the secondary boot area is a second contiguous block of memory within the boot non-volatile memory. The first and the second contiguous blocks of memory have no overlapping sets of addresses.

According to certain aspects of the present disclosure, a computer-program product tangibly embodied in a non-transitory machine-readable storage medium is provided. The non-transitory machine-readable storage medium includes instructions configured to cause a data processing apparatus to perform operations including booting a baseboard management controller (BMC) of a computing system from a secondary boot area of a boot non-volatile memory of the computing system. The boot non-volatile memory is coupled to both the BMC and a central processing unit (CPU) of the computing system. The operations further include receiving, at the BMC, a system reset signal or a power on signal. The operations further include handing over, by the BMC, access to the boot non-volatile memory of the computing system to the CPU. The operations further include booting, by the CPU, a basic input/output system (BIOS) from a primary boot area of the boot non-volatile memory. The operations further include handing over, by the CPU, access to the boot non-volatile memory of the computing system to the BMC.

In an implementation, the boot non-volatile memory is a serial peripheral interface (SPI) flash. In an implementation, the secondary boot area is only accessible by the BMC, and the primary boot area is only accessible by the CPU.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION

Figure 1:
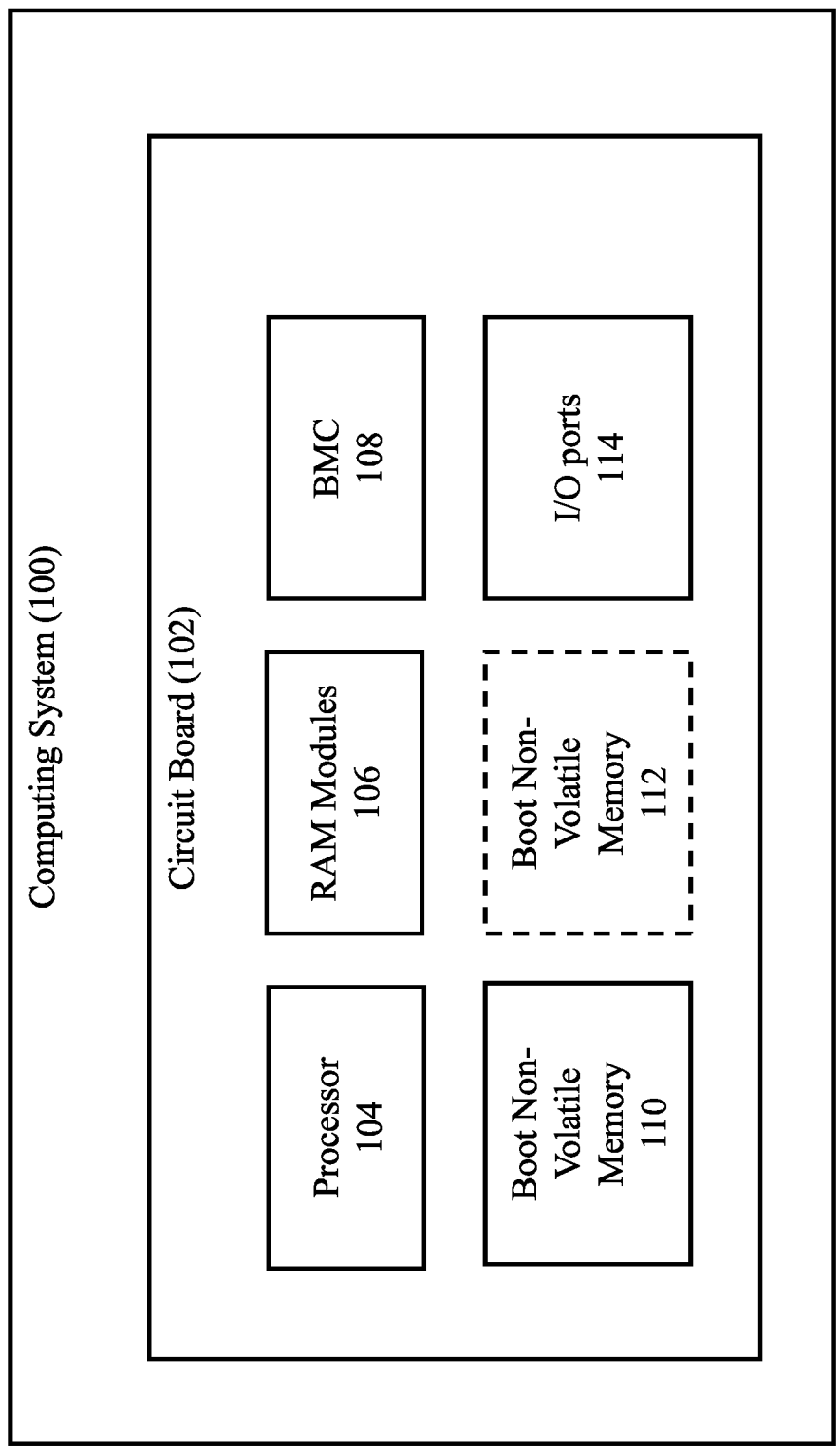
FIG. 1 is a block diagram of a computing system, according to certain aspects of the present disclosure.

In a computing system, a processor (e.g., a central processing unit (CPU)) is typically involved in booting the basic input/output system (BIOS), and a baseboard management controller (BMC) is typically involved in booting the BMC. Since the booting sequence for the BIOS and the BMC are independent of each other, the BMC and the BIOS are typically booted at the same time to reduce delay associated with initializing the computing system. As such, the computing system is equipped with two non-volatile memory modules (e.g., two flash modules) so that the booting instructions for the BIOS are stored in a first non-volatile memory module, and the booting instructions for the BMC are stored in a second non-volatile memory module. The BMC and the CPU can access their individual non-volatile memory modules at the same time. A multiport non-volatile memory module by itself does not solve this problem because the BMC and CPU typically operate at the same time. The BMC may be saving data to the multiport non-volatile memory module when the CPU may be accessing and/or saving data to the multiport memory module. In this scenario, the addressing scheme for the multiport memory module can get complicated. In order to avoid data collision and/or corrupted data, two non-volatile memory modules are provided on conventional computing systems.

Providing two non-volatile memory modules on the same computing system just for initializing the computing system can be wasteful. The second non-volatile memory module provided can occupy space on a motherboard that could have been used for another component. Physical space on a motherboard is limited, and scaling trends in computer engineering have had a goal of fitting as much hardware on the motherboard as possible in order to boost functionality of computing systems. Furthermore, the scaling trends sometimes involve reducing the size of the motherboard so that computing systems can have a smaller form factor. Reducing hardware components, for example, reducing the number of non-volatile memory modules provided on the motherboard, can reduce financial costs associated with building computing systems. Thus, the present disclosure provides systems and methods for using a single non-volatile memory module to boot both the BIOS and BMC. A booting sequence that accommodates sharing the single non-volatile memory module is provided.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Referring to FIG. 1, a block diagram of a computing system 100 is provided. Examples of the computing system 100 include a server, a laptop, a desktop computer, a smartphone, etc. The computing system 100 includes a circuit board 102. The circuit board 102 can be a printed circuit board (PCB) that serves as a communications backbone for all components and external peripherals that connect to the computing system 100. In some examples, the circuit board 102 is a motherboard that includes copper connecting traces and copper planes for power and signal isolation. The motherboard can include a processor 104, random access memory (RAM) modules 106, a BMC 108, one or more flash memories 110, 112, and/or one or more input/output (I/O) ports 114. The flash memory 112 is optional.

Although indicated as singular in FIG. 1, the processor 104 can be one or more processors (e.g., one processor, two processors, three processors, etc.). The processor 104 can include CPUs and GPUs. In some implementations, GPUs are separated from CPUs and communicate with CPUs via the one or more I/O ports 114 on the circuit board 102. For example, the I/O ports 114 include peripheral component interconnect express (PCIe) slots for receiving GPUs, and the CPUs can manage initialization and operation of the GPUs via the PCIe bus standard. The GPUs are coupled to video interfaces that allow monitors or screens to connect to the circuit board 102.

The RAM modules 106 can include dual inline memory modules (DIMMs) of double data rate synchronous dynamic random access memory (DDR SDRAM). The RAM modules 106 are high speed volatile memory modules that serve as main memory for the processor 104. The main memory for the processor 104 is used when cache memory or register memory of the processor 104 does not include information that the processor 104 needs. The RAM modules 106 are higher capacity memory when compared to the cache memory or register memory of the processor 104.

The one or more flash memories 110, 112 are provided on the circuit board 102 in order to facilitate initialization of components of the computing system 100. The flash memory 110 can be a BIOS non-volatile memory (e.g., a read only memory (ROM)) shared with the BMC 108 for booting both the BIOS and the BMC 108. When placed on the circuit board 102, the flash memory 110 can be placed closer to the BMC 108 than the processor 104 since in some implementations, the BMC 108 accesses the flash memory 110 more frequently than the processor 104. In some implementations, the flash memory 110 is placed midway between the processor 104 and the BMC 108 due to an access speed of the flash memory 110 being in the tens of megahertz, much slower than any delays caused by the separation of the flash memory 110 from any of the BMC 108 or the processor 104. The flash memory 112 can be omitted from the computing system 100 or can be provided for other storage. For example, the flash memory 112 can be used as a backup storage or long-term storage for storing system errors. In some implementations, the flash memories 110, 112 are serial peripheral interface (SPI) flash memories. In some implementations, the flash memory 112 is replaced with another component that has a similar physical footprint on the circuit board 102, thus enhancing functionality of the computing system 100. For example, removing the flash memory 112 can save about 15 mm by 15 mm, and this saved space can accommodate other components (e.g., two logical switches, two I2C bus switches, or one trusted platform module).

The BMC 108 is a specialized controller (or processor) for managing operations of the computing system 100. In some implementations, the BMC 108 enables remote monitoring of the computing system 100, having communication channels to different components of the computing system 100. For example, the BMC 108 can allow remote monitoring of fan speeds, temperature sensors, hard drive faults, power supply failures, operating system faults, etc. The BMC 108 can include internal temporary cache memory that facilitates the BMC 108 processing of machine readable instructions. Example BMCs include ASPEED AST2300, AST2400, AST2500, AST2600, etc.

The one or more I/O ports 114 can include serial AT attachment (SATA) ports to connect bus adapters to storage devices such as hard disk drives, solid state drives, optical drives, etc. The I/O ports 114 can include more PCI or PCIe ports for receiving cards such as Ethernet cards, Wi-Fi cards, Bluetooth cards, sound cards, etc. The I/O ports 114 can include universal serial bus (USB) ports to connect peripheral devices or mass storage devices.

Figure 2:
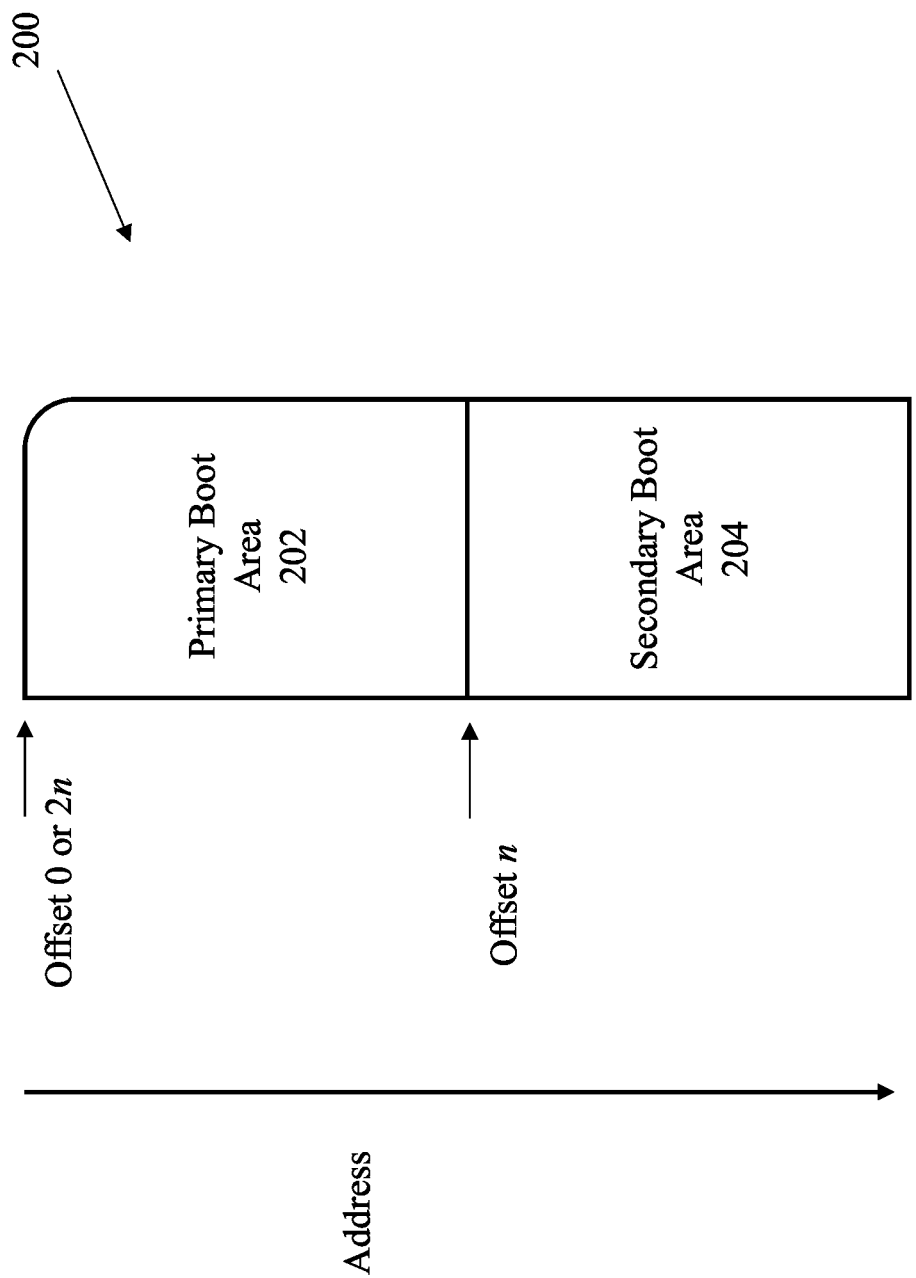
FIG. 2 is a block diagram of a boot non-volatile memory showing primary and secondary boot areas, according to certain aspects of the present disclosure.

Referring to FIG. 2, a block diagram showing a boot non-volatile memory 200 having at least two boot partitions, a primary boot area 202, and a secondary boot area 204. The flash memory 110 (FIG. 1) is an example of the boot non-volatile memory 200. In an implementation, the primary boot area 202 represents a first contiguous block of non-volatile memory with a first set of consecutive memory addresses, and the secondary boot area 204 represents a second contiguous block of non-volatile memory with a second set of consecutive memory addresses. Memory addresses in the first contiguous block and the second contiguous block do not overlap. The primary boot area 202 stores BIOS image while the secondary boot area 204 stores BMC image. The BIOS image is a file stored in the primary boot area 202 that includes instructions for basic setup of the computing system 100 (FIG. 1). The BIOS image includes a power-on self-test (POST) function, a bootstrap loader function, load BIOS drivers function, and/or BIOS configuration setup. The POST function is an initial test of computer hardware to ensure errors do not exist before loading of an operating system of the computing system 100 (FIG. 1). The bootstrap loader function locates the operating system on the computing system 100 (FIG. 1), and in some implementations, can pass control to the operating system once the BIOS setup is complete. The load BIOS drivers function involves executing low-level drivers to provide basic operational control over some hardware components of the computing system 100 (FIG. 1). In some cases, these hardware components include peripheral devices like mice, keyboards, or other input devices. The BIOS configuration setup is a program that allows configuring hardware settings (e.g., date and time). The BMC image includes an embedded operating system, an application for management function, space configurations concerning saving BMC log and configuration data, etc. The BMC image facilitates booting the BMC from the secondary boot area 204.

In an implementation, the primary boot area 202 is accessible at an address with an offset of 0 or 2n, and the secondary boot area 204 is accessible at an address with an offset of n. The addresses for the boot non-volatile memory 200 span 0 to 2n−1. For example, in a 64 MB flash memory, the primary boot area 202 and the secondary boot area 204 will have the same memory capacity, thus 32 MB each. The first addressable 32 MB will correspond to the primary boot area 202 and the second addressable 32 MB will correspond to the secondary boot area 204.

Figure 3:
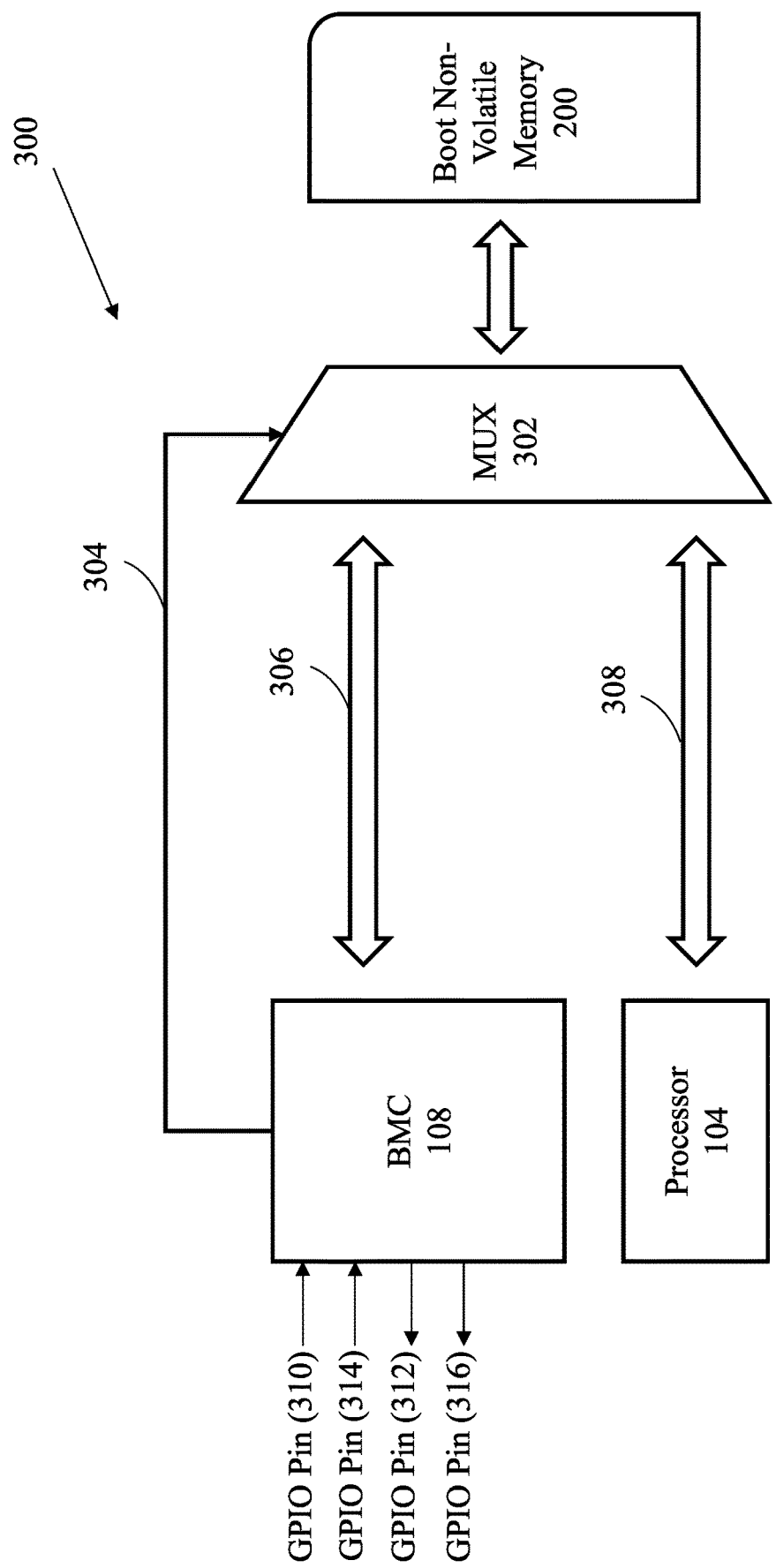
FIG. 3 is a block diagram of a circuit for accessing the boot non-volatile memory of FIG. 2, according to certain aspects of the present disclosure.

Referring to FIG. 3, a block diagram showing a circuit 300 for accessing the boot non-volatile memory 200 is provided, according to some implementations of the present disclosure. The circuit 300 is a subsystem of the computing system 100 (FIG. 1). The boot non-volatile memory 200 is equivalent to the flash memory 110 (FIG. 1). Organization of the boot non-volatile memory 200 is described in connection with FIG. 2 as having the primary boot area 202 (FIG. 2) that includes a BIOS image and the secondary boot area 204 (FIG. 2) that includes a BMC image. The BMC 108 can select a boot partition from the boot non-volatile memory 200 using control signal 304. The BMC 108 configures a multiplexer (MUX) 302 to select between a first data bus 306 or a second data bus 308. For example, if the control signal 304 has a value of logic 0, then the MUX 302 selects the first data bus 306, and if the control signal 304 has a value of logic 1, then the MUX 302 selects the second data bus 308. When the first data bus 306 is selected, then the BMC 108 can read/program the boot non-volatile memory 200 via the MUX 302. When the second data bus 308 is selected, then the processor 104 can read/program the boot non-volatile memory 200 via the MUX 302. The MUX 302 ensures that only one of the BMC 108 or the processor 104 accesses the boot non-volatile memory 200 when either one of the BMC 108 is booting or the BIOS is booting. Both the BMC 108 and the processor 104 cannot access the boot non-volatile memory 200 at the same time while booting.

In some implementations, while booting the BMC 108, the BMC 108 can only access the secondary boot area 204 of the boot non-volatile memory 200, and while booting the BIOS, the processor 104 can only access the primary boot area 202 of the boot non-volatile memory 200. Due to hardware strapping, as illustrated in FIG. 3, the BMC 108 can switch the control signal 304 appropriately to select appropriate boot image from the primary boot area 202 or the secondary boot area 204. In some implementations, once the BIOS POST is completed, the processor 104 no longer needs BIOS image access, therefore, the BMC 108 sets the control signal 304 to select the first data bus 306 by default. Once the BIOS and the BMC 108 are booted and configured, during runtime, the BMC 108 can access all addressable locations on the boot non-volatile memory 200, including the primary boot area 202. For example, the BMC 108 can access the primary boot area 202 during runtime to perform background BIOS upgrade of the BIOS image.

In some implementations, the BMC 108 is connected to various general purpose input/output (GPIO) pins. A first GPIO pin 310 can be an input pin for a system reset (i.e., an input that resets the computing system 100 of FIG. 1). A second GPIO pin 312 can be an output pin for a chipset reset (i.e., an output that resets and initiates booting the BIOS). A third GPIO pin 314 can be an input pin for power on (i.e., an input pin for turning on the computing system 100 of FIG. 1). A fourth GPIO pin 316 can be an output pin for a power controller to manage power provision to different parts of the computing system 100 (FIG. 1). That is, fourth GPIO pin 316 acts as a power button to send power ON/OFF requests to the system. By routing power on and system reset signals through the BMC 108, the BMC 108 can capture these inputs, using them to control behavior of the computing system 100 (FIG. 1) when the computing system 100 is powered on or reset. Based on the booting sequence of the computing system 100 (FIG. 1), the BMC 108 can switch between the primary boot area 202 (FIG. 2) or the secondary boot area 204 (FIG. 2).

Figure 4:
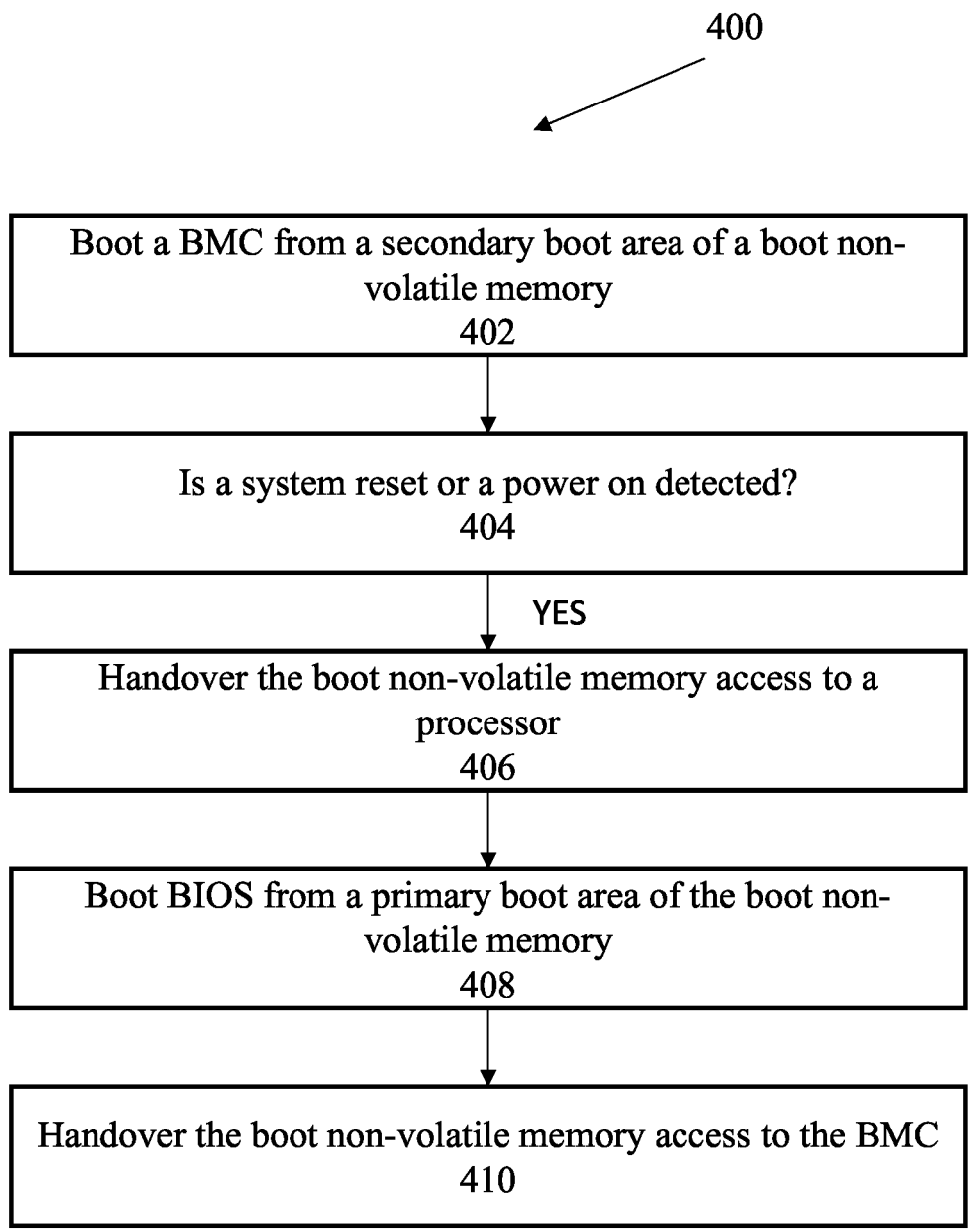
FIG. 4 is a flow diagram illustrating steps for booting the basic input/output system (BIOS) and BMC, according to certain aspects of the present disclosure.

Referring to FIG. 4, a flow diagram illustrating a process 400 for booting BIOS and BMC from a same boot memory (e.g., the boot non-volatile memory 200 of FIG. 3), according to certain aspects of the present disclosure. The process 400 will be discussed using the circuit 300 of FIG. 3. At step 402, the BMC 108 (FIG. 1) is booted from the secondary boot area 204 of the boot non-volatile memory 200 (both in FIG. 2). The BMC 108 is initialized to monitor the first and third GPIO pins 310, 314 to detect system reset and power on signals. The MUX 302 is set using the control signal 304 to select for the BMC 108 and the first data bus 306.

At step 404, the BMC 108 determines whether either the system reset or the power on signal is received from the first or third GPIO pins 310, 314. If the system reset or the power on signal is not detected, then the BMC 108 remains in a waiting state, monitoring the first and third GPIO pins 310, 314.

If the system reset or the power on signal is detected at step 404, then the BMC 108 hands over access of the boot non-volatile memory 200 to the processor 104 (FIG. 1) at step 406. Prior to the detection of the system reset or the power on signal, the BMC 108 may be monitoring components of the computing system 100 and may have unsaved data stored in a volatile runtime memory (e.g., a memory internal to the BMC or a separate runtime memory). The BMC 108 flushes contents of the runtime memory into the secondary boot area 204 of the boot non-volatile memory 200. Once the contents of the runtime memory associated with the BMC 108 are written to the boot non-volatile memory 200, the BMC 108 halts access to the boot non-volatile memory 200. That is, the BMC 108 no longer performs configuration updates, reads, or writes to the boot non-volatile memory 200. In some implementations, any changes to the BMC 108 after halting access to the boot non-volatile memory 200 are stored in the volatile runtime memory. The BMC 108 then changes the control signal 304 to switch the MUX 302, allowing the processor 104 access to the boot non-volatile memory 200 via the second data bus 308. The BMC 108 then sends the system reset or power on request signal via the second and fourth GPIO pins 312, 316.

At step 408, the processor 104 boots the BIOS from the primary boot area 202 (FIG. 2) of the boot non-volatile memory 200. The processor 104 fetches instructions stored in the BIOS image stored in the primary boot area 202 to start BIOS POST. During BIOS POST, the processor 104 updates BIOS configuration data (BIOS setup etc.) in the primary boot area 202.

At step 410, the processor 104 hands over access to the boot non-volatile memory 200 to the BMC 108. Alternatively, the BMC 108 takes over access of the boot non-volatile memory 200 at step 410. Once booting the BIOS is completed at step 408, the processor 104 notifies the BMC 108 that the BIOS is initialized. In some implementations, the processor 104 sends a notification to the BMC 108 via hardware (e.g., by using one or more GPIO pins being monitored by the BMC 108). In some implementations, the processor 104 sends the notification to the BMC 108 via software (e.g., by using Intelligent Platform Management Interface commands). After being notified, the BMC 108 triggers the MUX 302, switching back to the second data bus 308. The BMC 108 then flushes contents of the runtime memory associated with the BMC 108 into the secondary boot area 204 of the boot non-volatile memory 200. Since the BMC 108 does not remain dormant while the BIOS is booting, the BMC 108 includes internal controls to manage unsaved data size such that the unsaved data size is kept below the physical size of the runtime memory associated with the BMC 108.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A computing system comprising:
   a central processing unit (CPU);
   a baseboard management controller (BMC) that selects a boot partition in the computing system; and
   a boot non-volatile memory coupled to both the CPU and the BMC, the boot non-volatile memory storing at least two boot partitions as a primary boot area including a basic input/output system (BIOS) image and a secondary boot area including a BMC image, wherein the BMC switches between the secondary boot area to boot the BMC and the primary boot area to boot a BIOS from the BIOS image, wherein only the primary boot area is accessible while booting the BIOS and only the secondary boot area is accessible while booting the BMC.

2. The system of claim 1, further comprising:
   a multiplexer (MUX) coupled to the boot non-volatile memory, the BMC, and the CPU, wherein the MUX receives a control signal from the BMC for switching access between the primary boot area and the secondary boot area.

3. The system of claim 1, wherein the boot non-volatile memory is a serial peripheral interface (SPI) flash.

4. The system of claim 1, wherein the secondary boot area is only accessible by the BMC and the primary boot area is only accessible by the CPU during boot-time, and wherein during system runtime, the primary boot area is accessible by the BMC.

5. The system of claim 1, wherein the BMC is booted from the secondary boot area first before the BIOS is booted from the primary boot area.

6. The system of claim 1, wherein general purpose input/output (GPIO) pins that indicate system reset or power on signals are routed to the BMC, and wherein status of the system reset or the power on signals are used by the BMC to determine switching between the primary boot area and the secondary boot area of the boot non-volatile memory.

7. The system of claim 6, wherein receiving any one of the system reset or the power on signals triggers switching from the secondary boot area to the primary boot area.

8. The system of claim 7, wherein prior to switching from the secondary boot area to the primary boot area, the BMC flushes a runtime memory of the BMC to the secondary boot area.

9. The system of claim 7, wherein the BMC receiving a notification of a completion of the BIOS booting triggers switching from the primary boot area to the secondary boot area.

10. A computer-implemented method, comprising:
    booting a baseboard management controller (BMC) of a computing system from a secondary boot area of a boot non-volatile memory of the computing system, the boot non-volatile memory coupled to both the BMC and a central processing unit (CPU) of the computing system;
    receiving, at the BMC, a system reset signal or a power on signal;
    handing over, by the BMC, access to the boot non-volatile memory of the computing system to the CPU;
    booting, by the CPU, a basic input/output system (BIOS) from a primary boot area of the boot non-volatile memory; and
    handing over, by the CPU, access to the boot non-volatile memory of the computing system to the BMC.

11. The computer-implemented method according to claim 10, wherein the BMC provides a control signal to a multiplexer (MUX) when handing over access of the boot non-volatile memory to the CPU or when taking over access of the boot non-volatile memory, the MUX being coupled to the boot non-volatile memory, the BMC, and the CPU.

12. The computer-implemented method according to claim 10, wherein the boot non-volatile memory is a serial peripheral interface (SPI) flash.

13. The computer-implemented method according to claim 10, wherein during boot-time, the secondary boot area is only accessible by the BMC and the primary boot area is only accessible by the CPU and wherein during system runtime, the primary boot area is accessible by the BMC.

14. The computer-implemented method according to claim 10, wherein the system reset signal or the power on signal are received from general purpose input/output (GPIO) pins monitored by the BMC.

15. The computer-implemented method according to claim 10, wherein handing over the boot non-volatile memory access to the CPU includes flushing a runtime memory of the BMC to the secondary boot area.

16. The computer-implemented method according to claim 10, further including:
    receiving, by the BMC, a notification of a completion of the BIOS booting, the notification indicating that the BMC take over boot non-volatile memory access from the CPU.

17. The computer-implemented method according to claim 10, wherein the primary boot area is a first contiguous block of memory within the boot non-volatile memory, and the secondary boot area is a second contiguous block of memory within the boot non-volatile memory, the first contiguous block of memory and the second contiguous block of memory having no overlapping sets of addresses.

18. A computer-program product tangibly embodied in a non-transitory machine-readable storage medium, including instructions configured to cause a data processing apparatus to perform operations including:
- booting a baseboard management controller (BMC) of a computing system from a secondary boot area of a boot non-volatile memory of the computing system, the boot non-volatile memory coupled to both the BMC and a central processing unit (CPU) of the computing system;
- receiving, at the BMC, a system reset signal or a power on signal;
- handing over, by the BMC, access to the boot non-volatile memory of the computing system to the CPU;
- booting, by the CPU, a basic input/output system (BIOS) from a primary boot area of the boot non-volatile memory; and
- handing over, by the CPU, access to the boot non-volatile memory of the computing system to the BMC.

19. The computer-program product of claim 18, wherein the boot non-volatile memory is a serial peripheral interface (SPI) flash.

20. The computer-program product of claim 18, wherein during boot-time, the secondary boot area is only accessible by the BMC and the primary boot area is only accessible by the CPU, and wherein during system runtime, the primary boot area is accessible by the BMC.

* * * * *